June 26, 1956   T. R. SNEYD-KYNNERSLEY   2,752,163
WHEELED CARRIER FOR TRANSPORTING LUGGAGE
Filed Jan. 14, 1953
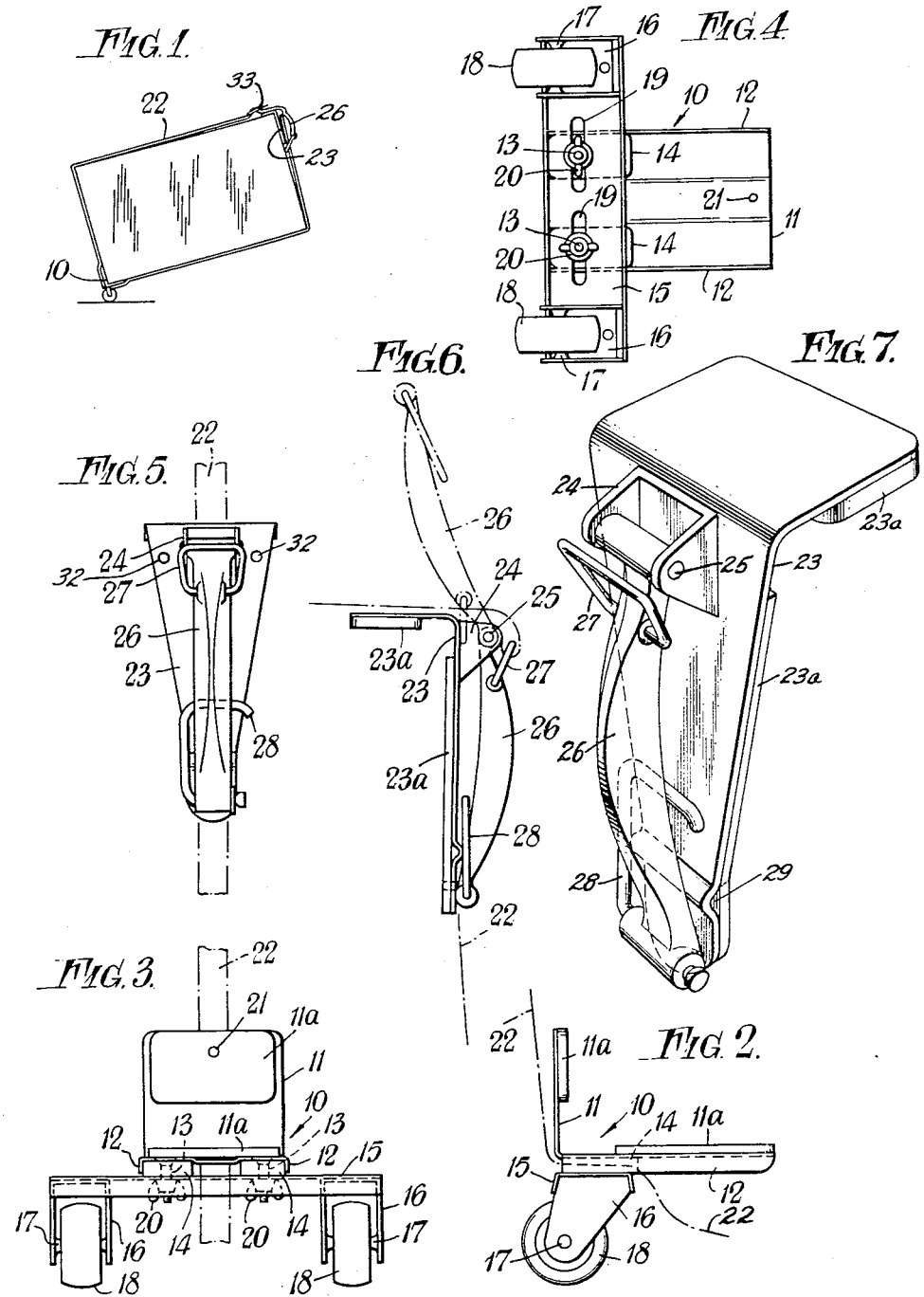

United States Patent Office 2,752,163
Patented June 26, 1956

2,752,163

WHEELED CARRIER FOR TRANSPORTING LUGGAGE

Thomas Ralph Sneyd-Kynnersley, London, England

Application January 14, 1953, Serial No. 331,186

Claims priority, application Great Britain February 11, 1952

4 Claims. (Cl. 280—47.26)

This invention relates to means for facilitating the handling or porterage of suitcases and similar articles of luggage.

According to the invntion, there is provided a wheeled carrier adapted to be applied to one edge or corner of a suitcase or the like in such a manner as to support the latter, such carrier comprising a frame or body member of L or substantially L-shape adapted to fit around an edge or corner of a suitcase or the like and a wheel assembly which is so mounted on said frame or body as to be capable of adjustment laterally with respect thereto. Preferably the wheel assembly is also so mounted in position on the frame or body as to be readily removable and replaceable. Furthermore, the wheel carrier as a whole is preferably so constructed that it may either be rigidly affixed to the suitcase or the like as by means of bolts, rivets or the like or be secured on said suitcase or the like by means of a strap which is passed around the latter.

The invention also includes the provision of a handle assembly which is adapted to be employed in conjunction with the wheeled carrier, said handle assembly being so designed as to be capable of application to that edge or corner of the suitcase or the like diagonally opposite that at which the wheeled carrier is adapted. The handle assembly is also preferably so constructed that it may either be affixed directly to the suitcase or the like as by means of bolts, rivets or the like or be secured in position by a strap which is placed around said suitcase or the like and serves also to retain the wheeled carrier in position.

In order that the said invention may be clearly understood and readily carried into effect, the same will be hereinafter more fully described with reference to the accompanying drawings, in which:

Figure 1 shows in side elevation a suitcase to which a wheeled carrier and handle assembly according to the invention have been applied.

Figures 2, 3 and 4 are respectively side elevational, end elevational and under plan views respectively of the wheeled carrier.

Figures 5 and 6 are front and side elevational views respectively of the handle assembly.

Figure 7 is a perspective view of the assembly of Figures 5 and 6.

Referring now to the drawings, it will be seen that there is provided a wheeled carrier designated generally by 10 which consists primarily of a frame or body member and a wheel assembly. In the embodiment illustrated, the frame or body member comprises a metal or other material plate 11 bent to an L or substantially L-shape so that on application to the edge or corner of a suitcase it will fit therearound. In order to impart rigidity or stiffness and a more finished appearance to the frame or body member, the edge portions of one limb thereof are turned downwardly as indicated at 12. Mounted in that limb of the frame or body member having the down turned edge portions are two screws or threaded studs 13 which are adapted to serve as securing means for the wheel assembly as will be hereinafter more fully described. Mounted on the undersurface of that limb of said frame or body member carrying the aforesaid screws 13 are two pads or packing members 14 which may conveniently comprise pads or blocks of rubber and which are so dimensioned and relatively so spaced as to provide a pathway or passage for a strap therebetween.

The wheel assembly comprises an elongated rectangular plate or the like 15, the longitudinal edge portions of which are turned downwardly thereby to stiffen or reinforce the same and at the same time to impart to said plate a shallow channel formation. Located on the undersurface of the plate (i. e. within the channel) and at or adjacent each end thereof is a bracket element 16 of inverted U shape each bracket thus providing a pair of depending legs which will serve to support an axle 17 on which a wheel or roller 18 is mounted. The wheels or rollers 18 which are thus mounted at or adjacent the opposite ends of the plate 15 and at the underside thereof may be formed of solid rubber or they may comprise disc like portions or hubs of metal or other suitable material on which rubber tyres are mounted.

The elongated rectangular plate 15 is formed with two elongated slots 19 which are arranged in alignment to extend lengthwise of said plate. The arrangement is such that when it is desired to apply the wheel assembly to the frame or body portion said assembly will be placed on the pads or packing members 14 above referred to in such a manner that the screws or studs 13 will pass through the elongated slots 19 in the rectangular plate 15 whereafter wing nuts 20 may be applied to the outer or free ends of said screws or studs in order to secure said wheel assembly rigidly in position on the frame or body member and thereby to form the complete wheeled carrier. It will be appreciated that by merely loosening the wing nuts 20, it will be possible to adjust the wheel assembly laterally with respect to the frame or body member the extent of the adjustment being determined by the length of the slots 19 in the rectangular plate 15.

In order to prevent damage to any suitcase to which it is applied and also to provide a suitable seating for such case the limbs of the frame or body member are provided with pads 11a of rubber or other resilient material.

By providing one or more apertures such as 21 in each of the limbs of the frame or body member it will be feasible permanently to affix the latter on a suitcase as by means of suitable bolts, rivets or the like. In the case where said frame or body member is permanently mounted on a suitcase it will be possible readily to remove the wheel assembly when the carrier is not in use and to replace the same, when required.

With the construction indicated above it will also be possible instead of affixing the frame or body portion of the carrier permanently to the suitcase, to secure said carrier as a whole to such case by means of a strap such as is indicated at 22 which strap is threaded between the two pads or packing members 14 disposed between the frame or body and the wheel assembly, said strap being passed completely around the case and being secured by means of a buckle or other fastening of known type.

In addition to the wheeled carrier a handle assembly is also provided, such assembly comprising an angled plate 23 which is adapted to seat on and fit around one edge or corner of a suitcase. Mounted on one limb of the plate 23 is a U-shaped bracket 24 adapted to support a pin 25 serving as a pivot for one end of a handle or grip member 26. The construction is such that a strap such as the strap 22 may be threaded between the limbs of the bracket 24. Pivotally mounted on the handle or grip member 26 at a point displaced from the pivot pin 25 is a loop or ring 27 which is so dimensioned as to permit of the passage of the aforesaid strap therethrough.

As indicated one end only of the handle or grip member is permanently attached to the plates 23, the other end remaining free so that said member is capable of functioning as a lever, the fulcrum being the pin 25. In order, however, to secure the free end of the handle or grip member 26 when the latter is required for use, said member is provided at its free end with a pivoted attachment 28, the shape of which can clearly be seen from Figure 5.

It will be noted that in order to allow of the permanent attachment of the plate 23 directly to a suitcase, said plate may be formed with apertures, such as are indicated at 32 in order to allow of the passage of retaining screws, rivets or the like. As with the wheeled carrier the plate 23 is also provided with pads 23a of rubber or other resilient material.

When the device is to be used, the strap which is of a length sufficient to extend completely around the suitcase to which the device according to the invention is to be applied will be threaded through the loop or ring 27 carried by the handle or grip member 26 and passed between the limbs of the bracket 24 and beneath the end of said member, being thereafter passed through the appropriate part of the wheeled carrier 10. The carrier 10 and the plate 23 are then applied to the appropriate corners of a suitcase as indicated in Figure 1 and the strap 22 is passed completely around the case as shown in Figure 1, the ends being secured by means of a suitable buckle 33. At this stage the handle or grip member 26 is maintained in the position shown in dotted lines in Figure 6, and the strap 22 on being secured by the buckle is pulled only moderately tight. In order finally to tension the strap 22 to such an extent as to ensure that the carrier 10 and the handle assembly will be rigidly held in position on the case, said handle or grip member 26 is then swung downwardly into the position shown in full lines in Figure 6. This movement of the handle or grip member 26 causes the loop or ring 27 to be moved through an arc and such movement pulls up a bight in the strap 22 thereby effectively to tighten the latter around the case. When the handle or grip member 26 has been moved into a position corresponding to its operative position it is secured merely by engaging the free horizontal limb of the attachment 28 under the tensioned strap.

With the parts in position on the case as shown in Figure 1, it is only necessary to place that end of the case at which the carrier is mounted on the ground and then subsequently by means of the handle to tilt the case so that the body thereof is moved out of contact with the ground and is supported solely by the wheels or rollers 18 incorporated in the carrier. In such a position the entire weight of the case and its contents is supported by the wheels or rollers and said case may readily be pulled or propelled along by anyone grasping the handle. Should it be required to discontinue movement it is only necessary to release the handle so that the case will rest on its end in an upright position. If so desired, whether the carrier is affixed permanently or is secured by a strap the wheel assembly may readily be removed at any time merely by removing the retaining wing nuts 20.

I claim:

1. A device for facilitating the handling or porterage of suitcases and the like; said device comprising a wheeled carrier adapted to be applied to a corner of a suitcase, a strap for extension around the suitcase to secure said wheeled carrier relative to the latter, and a handle assembly adapted to be applied to a corner of the suitcase diagonally opposite to that having the wheeled carrier thereon, said handle assembly including an angled plate shaped to fit around the related corner of the suitcase under said strap, a pair of spaced apart guide elements extending from said plate and between which said strap passes, a handle pivoted at one end on said guide elements, a ring on said handle intermediate the ends of the latter and through which said strap is extended, and securing means at the other end of said handle engageable with said strap to hold the handle in an operative position whereby, after said strap has been extended around the suitcase and through said ring and guide elements with the handle angularly displaced from said operative position, swinging of said handle to its operative position forms a bight in the strap to tension the latter.

2. A device according to claim 1; wherein said securing means includes a substantially C-shaped element pivoted on said other end of the handle so that, after tensioning of the strap, said C-shaped element can be engaged under the strap to provide a pivotal attachment for said other end.

3. A handle assembly for attachment by a strap to a suitcase around which the strap extends; said handle assembly including a plate element adapted to rest against the suitcase under the strap, a pair of guide elements extending from said plate element in spaced apart relationship to receive the strap therebetween, a handle pivoted at one end on said guide elements for swinging about an axis spaced from the plate element so that the strap can be passed between said plate element and said one end of the handle, a ring pivotally mounted on said handle and positioned near the pivoted end of said handle and through which the strap can be passed so that, during extension of the strap around a suitcase, the strap is passed through said ring and between the swinging axis of said handle and the plate element, whereby, when said handle is angularly displaced to its operative position, a bight is formed in the strap to tension the latter, and means pivotally mounted on the other end of said handle for engaging the strap and retaining the handle in said operative position after tensioning of the strap.

4. A handle assembly according to claim 3; wherein the last mentioned means includes a laterally open C-shaped element pivotally mounted on said other end of the handle for engagement under the tensioned strap.

References Cited in the file of this patent

UNITED STATES PATENTS

| 2,509,575 | Mingo | May 30, 1950 |
| 2,650,105 | Costikyan | Aug. 25, 1953 |

FOREIGN PATENTS

| 869,576 | France | Feb. 5, 1942 |
| 329,933 | Germany | Dec. 1, 1920 |
| 684,978 | Great Britain | Dec. 31, 1952 |